(12) United States Patent
Zhang

(10) Patent No.: US 7,978,622 B2
(45) Date of Patent: Jul. 12, 2011

(54) METHOD AND APPARATUS FOR COMPUTING A PATH IN A NETWORK DOMAIN

(75) Inventor: Renhai Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 298 days.

(21) Appl. No.: 11/914,929

(22) PCT Filed: May 19, 2006

(86) PCT No.: PCT/CN2006/001039
§ 371 (c)(1),
(2), (4) Date: Nov. 19, 2007

(87) PCT Pub. No.: WO2006/122506
PCT Pub. Date: Nov. 23, 2006

(65) Prior Publication Data
US 2008/0151896 A1    Jun. 26, 2008

(30) Foreign Application Priority Data

May 20, 2005    (CN) .......................... 2005 1 0070890

(51) Int. Cl.
*G01R 31/08* (2006.01)
(52) U.S. Cl. .................... 370/252; 370/351; 370/389
(58) Field of Classification Search .................. None
See application file for complete search history.

(56) References Cited

U.S. PATENT DOCUMENTS

| | | | |
|---|---|---|---|
| 7,496,105 B2 * | 2/2009 | Vasseur et al. ............... 370/401 |
| 2005/0008014 A1 | 1/2005 | Mitra et al. | |
| 2005/0074003 A1 | 4/2005 | Ball et al. | |
| 2006/0039391 A1 * | 2/2006 | Vasseur et al. ............... 370/409 |
| 2006/0176828 A1 * | 8/2006 | Vasseur et al. ............... 370/252 |
| 2006/0198308 A1 * | 9/2006 | Vasseur et al. ............... 370/238 |
| 2007/0019558 A1 * | 1/2007 | Vasseur et al. ............... 370/248 |

FOREIGN PATENT DOCUMENTS

| | | |
|---|---|---|
| CN | 1599328 A | 9/2003 |
| CN | 1601971 A | 9/2003 |

(Continued)

OTHER PUBLICATIONS

Farrel et al.; "Path Computation Element (PCE) Architecture, draft-ietf-pce-architecture-00.txt"; IETF Standard-Working-Draft, Internet Engineering Task Force, vol. PCE, 22 pages, (Mar. 21, 2005).
Le Roux et al.; "Requirements for Path Computation Element (PCE) Discovery, draft-leroux-pce-discovery-reqs-00.txt"; IETF Standard-Working-Draft, Internet Engineering Task Force, 10 pages, (Feb. 2005).
Zhang et al.; "PCE Communication Protocol Application Model"; draft-zhang-pce-comm-app-model-01.txt; IETF Standard-Working-Draft, Internet Engineering Task Force, CH No. 1, 10 pages, (Jun. 2005).

(Continued)

*Primary Examiner* — Ayaz R Sheikh
*Assistant Examiner* — Mounir Moutaouakil
(74) *Attorney, Agent, or Firm* — Finnegan, Henderson, Farabow, Garrett & Dunner L.L.P.

(57) ABSTRACT

A method for implementing path computation in a domain includes: storing, in each of path computation elements of a domain, global path computation information for path computation in the domain; and performing path computation by the path computation element in accordance with the global path computation information if a path is to be established as requested. A device for implementing path computation in a domain includes: a storage unit for storing global path computation information used for path computation in a domain; and a computation unit for performing path computation in accordance with the global path computation information stored in the storage unit if a path is to be established as requested.

13 Claims, 5 Drawing Sheets

FOREIGN PATENT DOCUMENTS

| | | | |
|---|---|---|---|
| CN | 1601966 | A | 3/2005 |
| EP | 1 395 003 | A2 | 3/2004 |
| EP | 1 473 887 | A2 | 3/2004 |

OTHER PUBLICATIONS

Extended European search report including supplementary European search report and European search opinion from the European Patent Office for European Application No. 06 74 1927, (Apr. 25, 2008).

International Search Report for International Application No. PCT/CN2006/001039, mailed Sep. 7, 2006 Huawei Technologies C., Ltd 4pgs.

European Patent Office Communication pursuant to Article 94(3) EPC, European search opinion for Application No. 06741927.5, mailed Jul. 24, 2008, Huawei Technologies C., Ltd 4 pgs.

Written Opinion of the International Searching Authority (translation) dated (mailed) Sep. 7, 2006, issued in related Application No. PCT/CN2006/001039, filed May 19, 2006, Huawei Technologies C., Ltd (5 pages).

First Chinese Office Action dated (mailed) Sep. 7, 2007, issued in related Chinese Application No. 200510070890.4 Huawei Technologies C., Ltd (7 pages).

* cited by examiner

METHOD AND APPARATUS FOR COMPUTING A PATH IN A NETWORK DOMAIN

FIELD OF THE INVENTION

The present application relates to a technical field of network communication, and particularly to a method and device for implementing path computation in a domain.

BACKGROUND OF THE INVENTION

Traffic engineering concerns an optimization of the overall performance of a network, and mainly aims to provide a highly effective and reliable network service, to optimize the use of network resource, and to optimize network traffic. In particular, there are two aspects: one is traffic-oriented, i.e. to concern how to improve the quality of service of the network; the other is resource-oriented, i.e. to concern how to optimize the use of network resource, mainly the effective utilization of bandwidth resource. With the increase of deployment and development of General Multi protocol Label Switching (GMPLS), inter-domain traffic engineering will span different operators and covers the GMPLS network.

Constrained path computation, e.g. Constrained Shortest Path First (CSPF) computation, is an important component of Multi protocol Label Switching (MPLS) and GMPLS traffic engineering. Path computation among multiple autonomous systems is complex, because computation elements within different autonomous systems should cooperate with each other for accomplishing the computation. A Path Computation Element (PCE) model-based path computing method may be applied to the inter-domain traffic engineering. The computing method does not affect the use of a computed path (the use of a computed path means, for example, establishment, maintenance and disconnection of a Label Switched Path (LSP)), but for computation of such an LSP.

In the PCE model-based path computing method, if a Path Computation Client (PCC) such as an ingress Label Switching Router (LSR) desires to establish an LSP, it first sends a request to a PCE, the request including basic information such as path destination and various constraint conditions. The PCE receives the request, and computes a path meeting the constraint conditions of the request in accordance with information such as Traffic Engineering Database (TED) and topology synchronized with the network, and returns the path to the PCC through a response message. The path is taken as an Explicit Route Object (ERO) parameter for establishing the LSP by the PCC. The computed path may include explicit nodes (e.g. a router) and loose nodes (e.g. a network segment, an area, or an autonomous system).

In the PCE model-based path computing method, computation made by each PCE usually covers an autonomous system. Particularly, the autonomous system is a range in which Traffic Engineering Database (TED) messages are distributed through an Internet Gateway Protocol (IGP).

In the PCE model, two basic protocols are needed: a PCE discovery protocol, responsible for PCC's discovering the existence of PCEs and computation capability thereof, and selecting a proper PCE to which a computation request is sent for computation in accordance with the information obtained from the protocol if the PCC has the computation request, and a PCE communication protocol, mainly responsible for transporting computation requests and response messages between PCC and PCE. The computation request from the PCC contains various constraint conditions. If a PCE receives a path computation request which is specified to be processed locally, the PCE will perform a path computation accordingly.

At present, corresponding overall requirements are proposed for the PCE communication protocol. However, no corresponding solution is proposed for particular issues involved in the requirements, and no solution is proposed for possibly confronted issues as mentioned in the requirements.

SUMMARY OF THE INVENTION

An object of the present invention is to provide a method and device for implementing path computation in a domain, thereby improving the efficiency and accuracy of the path computation in the domain such as in an autonomous system.

The object of the present invention is achieved by the following technical solutions:

The present invention provides a method for implementing path computation in a domain, including:

A. storing, in each of path computation elements of a domain, global path computation information for path computation in the domain;

B. performing path computation by a path computation element in accordance with the stored global path computation information if a path is to be established as requested.

The global path computation information includes:

all current path computation requests in the domain, and current network resource information available for allocation or current resource occupation information.

The step B includes:

B1. determining one of the path computation elements as a path computation element for this path computation and sending path computation requests to the path computation elements by path computation clients, if the path computation clients request to establish a path;

B2. performing the path computation in accordance with the stored global path computation information by the path computation element upon receiving the path computation request.

Or, the step B includes:

B11. determining one of the path computation elements by path computation clients, if the path computation clients request to establish a path;

B12. sending the path computation requests from the path computation clients to all of the path computation elements of an autonomous system, each of the path computation requests carrying an identifier of the determined path computation element;

B13. upon receiving the path computation requests, recording the received path computation requests by each of the path computation elements;

B14. performing the path computation in accordance with the stored global path computation information by the determined path computation element.

The process of recording the received path computation requests in the step B13 includes:

storing, path computation requests used for path computation to be performed in the path computation element, in turn in the path computation element of the domain in accordance with priorities of the path computation requests; and respectively storing path computation requests of other path computation elements of the domain.

In the present invention, before the path computation element processes the path computation request, the process of performing the path computation in accordance with the stored global path computation information includes:

C. obtaining the path computation requests of other path computation elements stored in the path computation element, determining whether there is a race condition between a pending path computation request and the path computation requests of other path computation elements; and if there is a race condition, going to step D; otherwise going to step E;

D. after the path computation requests of other path computation elements is processed and said path computation element is synchronized based on a corresponding computed result, going to step E; and E. Performing the path computation in accordance with said path computation request.

The process of determining whether there is a race condition in the step C includes:

determining whether the pending path computation request and the other path computation requests occupy the same resource simultaneously and the resource can not met the requirements simultaneously in the domain; if yes, determining there is a race condition; otherwise, determining there is no race condition.

In the step B, path computation requests being processed and pending path requests of each path computation element of the domain are recorded in the path computation element; and in the step C, the path computation requests of other path computation elements refers to path computation requests being processed in other path computation elements.

The method for implementing path computation in a domain further includes:

F. returning a computation-disabled notification to the path computation client if the path computation element can not perform path computation in accordance with the received path computation request.

If the path computation element determines, in accordance with computation capability or busyness thereof, that the path computation element can not perform path computation in accordance with the received path computation request, the method further includes:

F1. if said path computation element determines, in accordance with computation capability or busyness thereof, that said path computation element can not perform path computation in accordance with the received path computation request, determining an available path computation element in accordance with the path computation requests of each path computation element stored;

F2. sending information on the available path computation element along with the computation-disabled notification to the path computation client.

The step F1 includes:

determining, by the path computation element, a path computation element containing a minimum number of path computation requests in accordance with the path computation requests of each path computation element stored; and taking the path computation element containing a minimum number of path computation requests as the available path computation element.

The step F2 further comprises:

upon receiving the notification returned from the path computation element, obtaining an identifier of the available path computation element and resending a path computation request to all of the path computation elements by the path computation client, the path computation request carrying the identifier of the available path computation element.

The method for implementing path computation in a domain further includes:

G. returning a path computed result to a corresponding path computation client and establishing a path in accordance with the returned path computed result by the path computation element; and H. if the path is successfully established, distributing information on the established path to all of the path computation elements of the domain by the path computation client, and updating path information and path computation requests of the global computing table stored in the path computation elements in accordance with the path information received.

The present invention further provides a device for implementing path computation in a domain, including:

a storage unit, adapted for storing global path computation information used for path computation in a domain; and a computation unit, adapted for performing path computation in accordance with the global path computation information stored in the storage unit if a path is to be established as requested.

In addition, the device may further includes: a determination unit, adapted for receiving a path computation request sent from a path computation client to all path computation elements in an autonomous system, recording the path computation request, and determining whether to perform path computation in accordance with an identifier carried in the path computation request.

In addition, the device may further includes: a race condition processing unit, adapted for, before performing path computation, obtaining path computation requests of other elements stored in the storage unit, determining whether there is a race condition between a pending path computation request and the path computation requests of other path computation elements, and instructing the computation unit to perform path computation in accordance with the path computation request in the case of avoiding a race condition.

In addition, the device may further includes: an available element notification unit, adapted for, if the available element notification unit can not be perform computation in accordance with a received path computation request, determining an available path computation element in accordance with the path computation requests of the path computation elements stored in the storage unit, and sending a computation-disabled notification along with information on the available path computation element to the path computation client.

In addition, the device may further includes: an information update unit, adapted for, upon a successful path establishment, receiving information on the established path which is distributed from the path computation client to all of the path computation elements in the domain, and updating path information and path computation requests of the global path computation information stored therein in accordance with the received path information.

As can be seen from the technical solution of the present invention, the task processing efficiency and accuracy of PCEs can be improved greatly through making the PCEs synchronize with the network state rapidly, i.e. updating the path information of the whole domain stored in the PCEs in a real time manner.

The implementation of the present invention can avoid race conditions effectively, improve the accuracy of PCEs processing computation task, and avoid the repeated sending of the same path computation request, thereby decreasing the protocol interaction and improving the operation efficiency of protocol.

In addition, the implementation of the present invention can realize reasonable and effective load sharing of computation request within the autonomous system in accordance with the path computation requests of the whole domain stored in the PCEs, thereby improving the overall operation efficiency of the corresponding protocol.

DETAILED DESCRIPTION OF THE INVENTION

Figure 1:
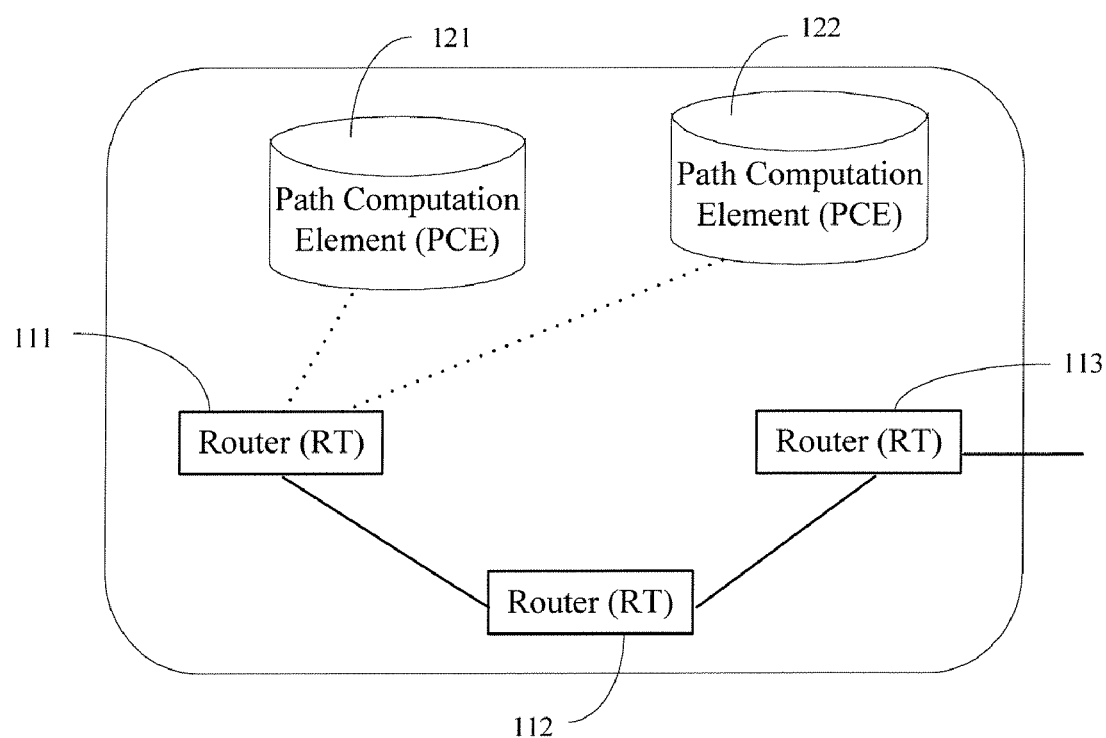
FIG. 1 is a schematic diagram of a PCE-mode networking architecture in which the present invention is applied.

The core of the present invention lies in that in the domain, each path computation element responsible for accomplishing path computation stores all computation requests in the current domain. Therefore, a race condition that is possibly confronted in distributed computation can be avoided effectively, intra-domain computation requests can still be processed in parallel if it is ensured that different computation requests do not result in any race condition, and an effective load sharing of computation is achieved in accordance with the requests.

The present invention may be applied in a domain, which includes various path resources managed independently and multiple path computation elements for sharing path computation in the domain.

The present invention is described as follows with an example of implementing the present invention in a traffic engineering domain, i.e. in a PCE autonomous system.

In the PCE autonomous system, according to the present invention, global path computation information is stored in each PCE respectively. The global path computation information includes all information for path computation within the whole autonomous system (e.g. all current path computation requests in the autonomous system, and current network resource information available for allocation or current resource occupation information). In this manner, it can be ensured that a corresponding path computation result can be rapidly and accurately obtained at each PCE. Therefore, the time for establishing an LSP is decreased greatly.

The PCE in the present invention may be implemented in a router, or implemented in a designated server, for realizing the path computation in the autonomous system.

In an autonomous system, the corresponding path computation may be performed by one or more PCEs. If there is only one PCE within the autonomous system, all computation requests within the autonomous system will be sent to the PCE, which is called an integrated path computation method. If there are multiple PCEs, all computation requests within the autonomous system may be distributed to different PCEs, thereby realizing load sharing of path computation, and reducing the possibility of computation failure due to a PCE block. This is called a distributed path computation method.

In the distributed path computation method, before sending a computation request, the PCC needs to know a computation capability of each PCE, e.g. capability of computing which Quality of Service (QoS), capability of computing a protection path and of computing a path for load sharing, capability and rate of TED synchronization, so that each PCC can select a proper PCE from the PCEs and send the computation request to the selected PCE. The prior art can meet these requirements. The present invention mainly concerns how the PCE side implements more reasonable path computation and obtains more accurate computation results if the above requirements are met.

During the implementation of the present invention, the following three issues should be considered.

(1) After an LSP is established in accordance with a path computed by a PCE, LSP information in the PCE should be updated, to ensure an accuracy of computation for other paths.

When a PCE performs path computation and returns a computed path to a PCC (e.g. ingress LSR), the PCE is in an asynchronous state before an LSP is established. This is because the LSP establishment may be failed and the established LSP may be inconsistent with the computed path, in other words, the network resource occupied for establishing the LSP may be different from the computed result of the PCE. If the PCE performs a new path computation in accordance with the computed path, another computed result is still possibly wrong. Therefore, it is required to update and maintain the network state information (e.g. TED and LSP) in accordance with the actual establishment situation after the LSP establishment succeeds or fails, so as to re-implement network synchronization and to ensure an accuracy of a processed result of next path computation request.

(2) A possibly occurred race condition should be solved.

In the distributed PCE network, the multiple PCEs may simultaneously process different path computation requests, e.g. a failed link is to be recovered, which may result in that multiple ingress LSRs send computation requests to different PCEs simultaneously, and thereby the multiple PCEs use and allocate a certain resource simultaneously when computing a path. Further, some LSPs fail to be established, the PCCs therefore request the PCEs to compute again, which decreases the efficiency of the PCE communication protocol.

(3) In the domain, each PCE may assist the PCCs to properly select a proper PCE for processing path computation requests from the PCCs, thereby improving the efficiency of the path computation.

If a PCC can not know the operation state of PCEs, requests may be distributed at different PCEs unevenly. Therefore, a PCE may be blocked due to too many requests. However, other PCEs may be in an idle state due to no computation task in it. Even though a PCE can notify the PCC that the PCE can not receive any computation request at present due to too much computation, the PCC can still not know whether other PCEs are blocked and can not select one of other PCEs, but to send requests to the other PCEs one by one, thereby decreasing the overall efficiency of PCE communication protocol, and making the reasonable load sharing of computation impossible to realize.

Considering the above three issues, the present invention is implemented to achieve rapid synchronization of path information in PCEs. The PCEs should maintain instant information of network resource state, to ensure the accuracy and timeliness of computed LSPs. Also the present invention can avoid occurring a race condition, i.e. if multiple PCEs perform path computation simultaneously within an area or an autonomous system, the present invention prevents the same resource from being occupied for many times by several computed results and thereby resulting in a race condition.

Furthermore, the present invention can realize reasonable load sharing of computation. If too many computation requests are sent to a PCE and the computation requests from PCCs may be blocked because no response is received at the PCCs. By the use of the technology of the present invention, the PCE notifies that messages are blocked in it, and besides returns another proper PCE capable of processing the path computation requests to the PCCs, thereby increasing the efficiency of PCE communication protocol and realizing reasonable load sharing of processing the path computation requests.

For a further understanding of the present invention, detailed embodiments of the method of the present invention are described in detail with reference to the drawings.

In the present invention, for implementing reliable and accurate path computation, each PCE should store path information established in a domain in a real time manner, i.e. network state should be synchronized in each PCE after a path is established in accordance with a computed result of a PCE. In other words, it should be ensured that path information in each PCE is synchronous with the network state in a real time manner. Therefore, the present invention adopts the following approach.

After each PCE performs path computation in accordance with a path computation request, it first returns a computed result to the PCC. Then the PCC sends downstream a signaling for establishing an LSP through an RSVP-TE (Resource ReserVation Protocol-Traffic Engineering) signaling, etc. with the computed result of the PCE as an ERO parameter. If an LSP is established successfully, the PCC distributes information on the established LSP to all PCEs through a parameter Record Route Object (RRO) of a returned message, so that all PCEs update LSP state information maintained in them, to maintain the PCEs as synchronous with the network state. In this manner, each PCE can store path state information of the whole domain which is updated in a real time manner, thereby effectively ensuring the accuracy of path computation in each PCE.

For solving the problems of race condition and load sharing in path computation in PCE, in the present invention a corresponding global computing table should be established and maintained in each PCE, for storing all path computation requests within a domain. The maintenance implementation and application of a global computing table involved in the method of the present invention will be described in detail as follows.

Figure 2:
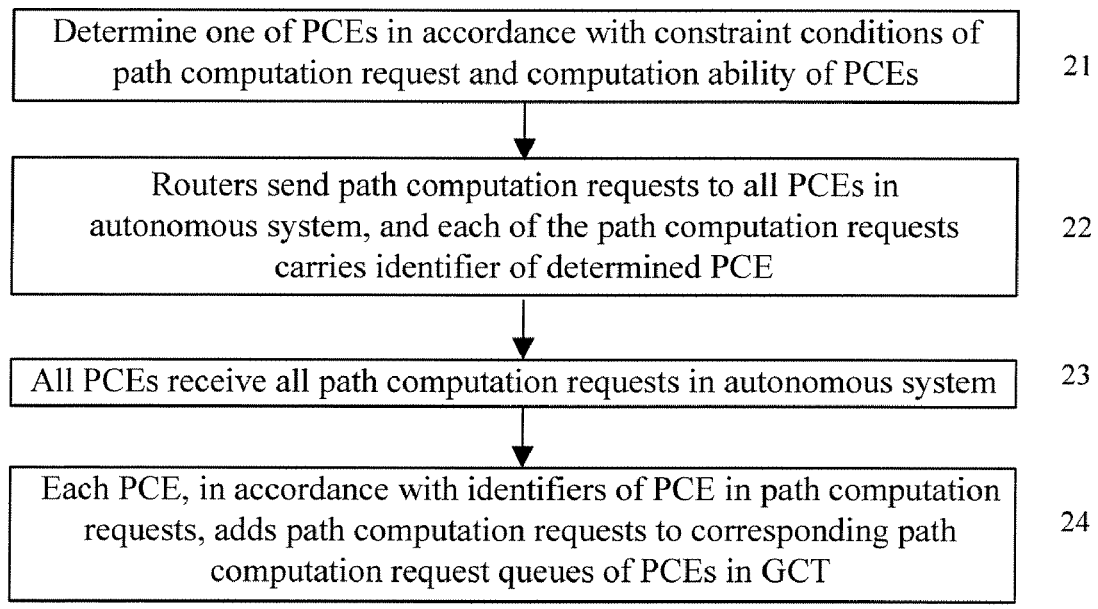
FIG. 2 is a flowchart of maintaining a global computing table in accordance with the present invention.

The maintenance of the global computing table is illustrated in FIG. 2.

A global computing table is established and maintained in each PCE, for storing path computation requests which should be processed by all PCEs within an autonomous system. In accordance with the path computation requests, the PCE can accomplish corresponding path computation accurately.

Figure 3:
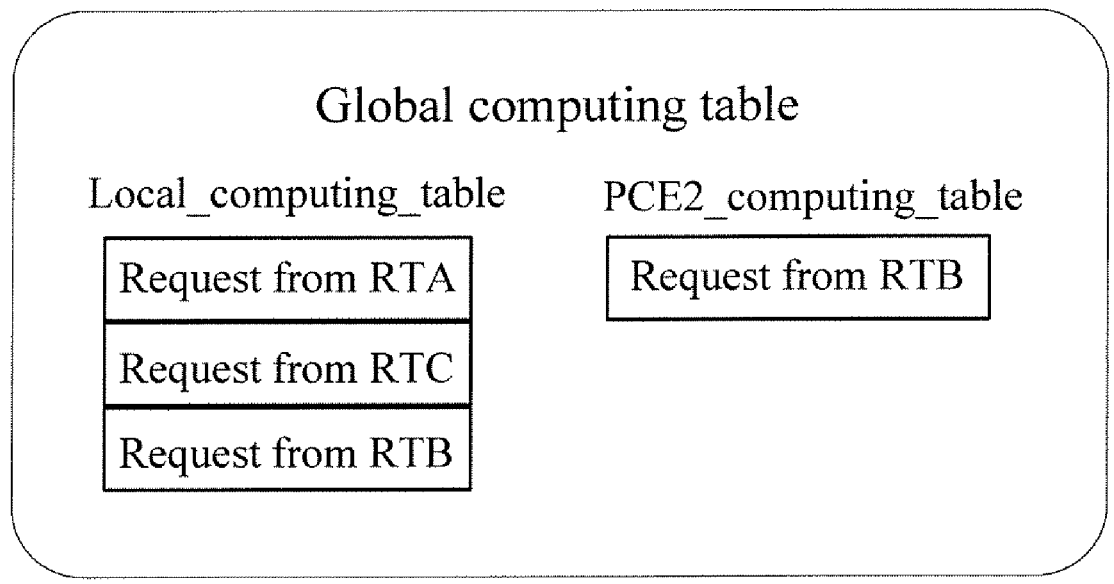
FIG. 3 is a structural schematic diagram of a global computing table in accordance with the present invention.

As illustrated in FIG. 3, the Global Computing Table (GCT) is particularly a table including current path computation requests in the whole network maintained in each PCE and more particularly a table including computation requests being processed and to be processed stored in each PCE in accordance with PCEs corresponding to the computation requests.

The following illustrates how the GCT is maintained.

In FIG. 1, an autonomous system is shown in a dashed line. The autonomous system includes three routers: RT 111, RT 112 and RT 113. In accordance with the PCE discovery protocol, each of the routers knows that the autonomous system includes two PCEs: PCE 121 and PCE 122.

As illustrated in FIG. 2, the update procedure of the GCT particularly includes the processes as follows.

Step 21: If three routers each have path computation requests, one of the PCEs is determined in accordance with constraint conditions of each path computation request and computation capability of each PCE.

Step 22: The routers send path computation requests to all PCEs in an autonomous system, and each of the path computation requests carries an identifier of the determined PCE.

Particularly, when sending the path computation requests to the determined PCE, the routers also send the path computation requests to other PCEs in the autonomous system. For example, when sending a path computation request to PCE 121, RT 111 also sends the path computation request to PCE 122.

Each of the path computation requests should include an identifier of a PCE which will process the request. The identifier may be, for example, IP address of a corresponding PCE. The IP address message segment does not act as a destination address of the request, but act as an identifier of a PCE which will process the request. Indeed, another identifier may be adopted for distinguishing the PCE from others.

Step 23: All PCEs respectively receive all path computation requests in the autonomous system through each PCC sending a request to all PCEs.

Step 24: Each PCE, in accordance with the identifiers of PCEs in each of the path computation requests, adds each of the path computation requests to corresponding path computation request queues to be processed by the PCE in the GCT.

Particularly, each PCE determines, in accordance with each identifier of PCE, whether itself should process the path computation request, and processes the path computation request which should be processed by the PCE. Also, each PCE adds the path computation requests to corresponding queues in accordance with the identifiers of PCEs and priorities. Thereby, in the autonomous system, each PCE has the same GCT.

For example, the GCT of PCE 110 is illustrated in FIG. 3, in which a local_computing_table records a computing list being processed locally in a current PCE (i.e. PCE 110). The local_computing_table includes three computation requests, which come from RT 111, RT 112 and RT 113 respectively. An order of the computation requests indicates priorities of the computation requests, but does not indicate time sequence of reception of requests. The PCE will obtain the path computation requests orderly from the table, and performs path computation. In FIG. 3, a PCE 120_computing_table (a computing list of PCE 120) records a list of current path computation requests in PCE 2. Therefore, the PCE 110 knows the requests being processing by PCE 120. And similarly, the PCE 120 knows the requests being processing by PCE 110.

The GCT includes path computation requests being processed and to be processed by each PCE.

The local_computing_table and the remote_computing_table of each PCE in the autonomous system form the GCT. Because the PCE communication protocol is based on reliable transmission, all GCTs in all PCEs are consistent with each other. If there is no path computation request currently in the autonomous system, the GCT is recorded as null.

Figure 4:
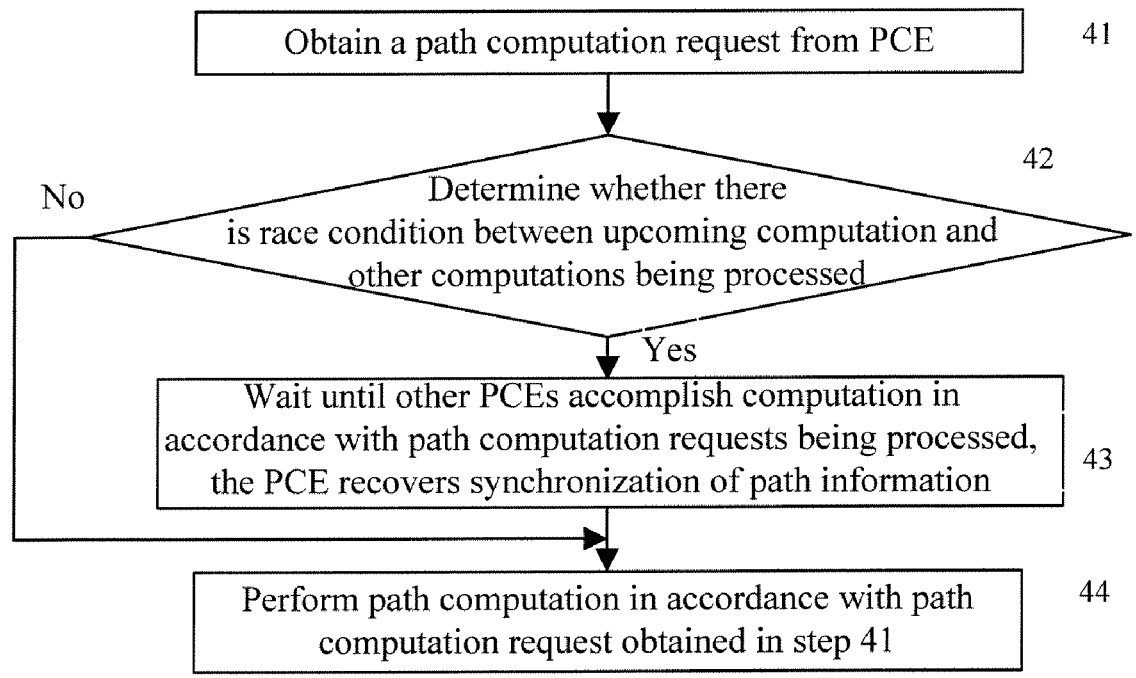
FIG. 4 is a flowchart of preventing a race condition in accordance with the present invention.

Upon establishment and maintenance of the above GCT, the present invention may adopt the table to solve a possibly occurred race condition during the path computation. The detailed solution, as illustrated in FIG. 4, includes the steps as follows.

Step 41: A path computation request is obtained from a path computation request queue in a PCE.

Step 42: Upon reviewing path computation request queues in other PCEs, it is determined whether there is a race condition between the upcoming computation and computation in other PCEs in accordance with path computation requests being processed in other PCEs. Particularly, it may be determined whether there is a race condition in accordance with possible path information and resource type information of the path computation requests. If there is a possible race condition, the procedure goes to step 43; otherwise, i.e. it is determined that there is no race condition, the procedure goes to step 44 with no need of waiting other PCEs to accomplish the computation.

Step 43: The computation in accordance with the path computation request obtained at this time is delayed, i.e. step 44 is performed after other PCEs accomplish the computation in accordance with path computation requests, recover synchronization and thereby avoiding the occurrence of race condition.

Step 44: Path computation is performed in accordance with the path computation request obtained in step 41.

Figure 5:
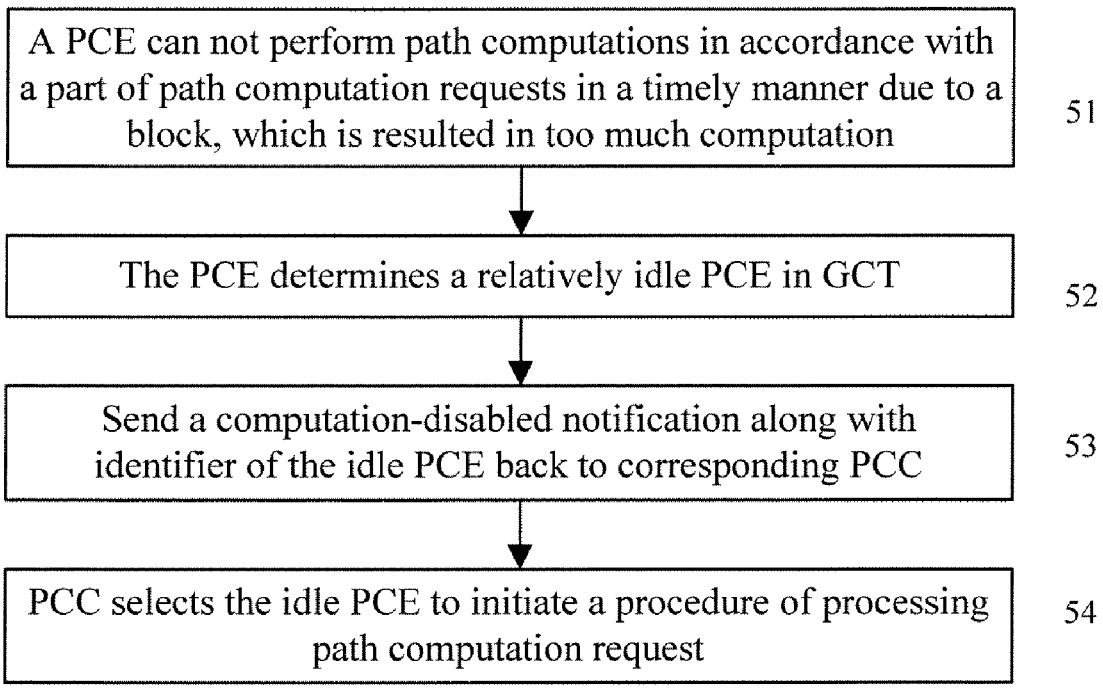
FIG. 5 is a flowchart of implementing task sharing of path computation in accordance with the present invention.

In the present invention, load sharing of path computation may be implemented by use of the above GCT. A detailed implementing procedure is illustrated in FIG. 5.

Step 51: A PCE can not perform path computations in accordance with a part of path computation requests in a timely manner due to a block, which is resulted from too much computation.

Step 52: The PCE determines a PCE containing a minimum number of path computation requests, i.e. a relatively idle PCE, in the GCT.

Step 53: A computation-disabled notification returned to a PCC along with an identifier of the idle PCE is sent to the corresponding PCC.

Step 54: Upon receiving the information, the PCC may select the idle PCE to initiate a procedure of processing a path computation request, thereby accelerating the procedure of path computation.

In other words, prior to the present invention, a PCE can feed overload information on itself back to a PCC so as to inform the PCC that the PCE can not process any request temporarily, but because the PCC is unable to know states of PCEs, a computation task can not be distributed again to another PCE reasonably. In this case, if the PCC selects another PCE to resend a request to it, it is still possibly be rejected by the another PCE. Therefore, one path computation request may be sent for many times for tries, until a certain PCE can process the request, which decreases an efficiency of PCE communication protocol.

Through the procedure of step 52 to step 54, i.e. the procedure based on the above GCT, each PCE clearly knows not only its computation task load, but also a current task load of other PCEs. Therefore, the PCE selects another PCE which has less or no computation task currently and has a corresponding processing capability in accordance with the GCT if the PCE itself is blocked. The PCE feeds back to the PCC that the PCE itself is in a block state and can not process any computation request, in the mean time the PCE feeds an identifier of the another PCE capable of processing the computation request back to the PCC, so that a blind selection of PCE by the PCC is avoided, an efficiency of PCE communication protocol is improved, and path computation task in the autonomous system can be distributed to each PCE reasonably.

As described above, the efficiency and accuracy of path computation can be improved greatly through synchronizing a PCE with the network state rapidly. And, the present invention can effectively prevent the occurrence of race conditions during path computation and further implements load sharing of path computation within the domain reasonably and effectively, which improves the overall operation efficiency of protocol.

The present invention further provides a device for implementing path computation in a domain. The device includes a storage unit, a computation unit, a determination unit, a race condition processing unit, an available element notification unit, and an information update unit.

The storage unit stores global path computation information adapted for path computation in a domain. If a path is to be established as requested, the computation unit performs a path computation in accordance with the global path computation information stored in the storage unit.

The determination unit receives a path computation request sent from a path computation client to all path computation elements in an autonomous system, records the path computation request, and determines whether to perform path computation in accordance with identifier information carried in the request.

Before the path computation, the race condition processing unit obtains path computation requests of other elements stored in the storage unit, determines whether there is a race condition between the pending path computation request and the path computation requests of other path computation elements, and instructs the computation unit to perform path computation in accordance with the path computation request in the case of avoiding a race condition.

If the available element notification unit can not be perform computation in accordance with a received path computation request, it determines an available path computation element in accordance with the path computation requests of all path computation elements stored in the storage unit, and sends a computation-disabled notification along with information on the available path computation element to the path computation client.

Upon a successful path establishment, the information update unit receives information on the established path which is distributed from the path computation client to all path computation elements in the domain, and updates path information and path computation requests of the global path computation information stored therein in accordance with the received path information.

The above is the description of merely detailed embodiments of the present invention. The protective scope of the present invention is not limited to these embodiments. Any variation or substitute that can be achieved easily by those skilled in the art within the disclosure of the present invention shall be covered by the present invention as defined by the appended claims.

The invention claimed is:

1. A method for implementing path computation in a traffic engineering domain, comprising:
  storing, in each of path computation elements of a domain, global path computation information for path computation in the domain, wherein the global path computation information includes all current path computation requests in the domain, and current network resource information available for allocation or current resource occupation information;
  determining one of the path computation elements by path computation clients, if the path computation clients request to establish a path;
  sending the path computation requests from the path computation clients to all of the path computation elements of an autonomous system, each of the path computation requests carrying an identifier of the determined path computation element;
  upon receiving the path computation requests, recording the path computation requests by each of the path computation elements;
  performing the path computation in accordance with the global path computation information by the determined path computation element;

wherein the recording the path computation requests comprises: storing, path computation requests used for path computation to be performed in said path computation element, in turn in said path computation element of the domain in accordance with priorities of the path computation requests; and respectively storing path computation requests of other path computation elements of the domain;

wherein the performing the path computation in accordance with the global path computation information comprises: step C. obtaining the path computation requests of other path computation elements stored in said path computation element, determining whether there is a race condition between a pending path computation request and the path computation requests of other path computation elements; and if there is a race condition, performing the path computation in accordance with said path computation request after the path computation requests of other path computation elements are processed and said path computation element is synchronized based on a corresponding computed result.

2. The method according to claim 1, wherein the process of determining whether there is a race condition comprises:

determining whether said pending path computation request and said path computation requests of other path computation elements occupy the same resource simultaneously and the resource can not meet requirements simultaneously in the domain; if yes, determining there is a race condition; otherwise, determining there is no race condition.

3. The method according to claim 1, wherein in the step of performing path computation by a path computation element in accordance with the global path computation information if a path is to be established as requested, a path computation request is processed and a pending path computation request of each path computation element of the domain is recorded, by the path computation element, in a global computing table (GCT) of said path computation element; and in the step C, the path computation requests of other path computation elements refers to path computation requests being processed in other path computation elements.

4. The method according to claim 1, further comprising:

returning a path computed result to a corresponding path computation client and establishing a path in accordance with the path computed result by said path computation element; and if the path is successfully established, distributing information on the established path to all of the path computation elements of the domain by the path computation client, and updating path information and path computation requests of the global computing table stored in the path computation elements in accordance with the information on the established path.

5. The method according to claim 1, comprising:

returning a computation-disabled notification to the path computation client if said path computation element can not perform path computation in accordance with said path computation request.

6. The method according to claim 5, wherein if said path computation element determines, in accordance with computation capability or busyness thereof, that said path computation element can not perform path computation in accordance with said path computation request, the method further comprises:

determining an available path computation element in accordance with the path computation requests of each path computation element stored;

sending information on the available path computation element along with the computation-disabled notification to the path computation client.

7. The method according to claim 6, wherein the step of determining an available path computation element in accordance with the path computation requests of each path computation element stored comprises:

determining, by said path computation element, a path computation element containing a minimum number of path computation requests in accordance with the path computation requests of each path computation element stored; and taking the path computation element containing a minimum number of path computation requests as the available path computation element.

8. The method according to claim 6, wherein the step of sending information on the available path computation element along with the computation-disabled notification to the path computation client further comprises:

upon receiving the computation-disabled notification returned from said path computation element, obtaining an identifier of the available path computation element and resending a path computation request to all of the path computation elements by the path computation client, said path computation request carrying the identifier of the available path computation element.

9. A device for implementing path computation in a traffic engineering domain, comprising:

a storage unit, adapted for storing global path computation information used for path computation in a domain; and a computation unit, adapted for performing path computation in accordance with the global path computation information stored in the storage unit if a path is to be established as requested, wherein the global path computation information includes all current path computation requests in the domain, and current network resource information available for allocation or current resource occupation information;

wherein performing the path computation further comprises: determining one of a plurality of path computation elements by path computation clients, if the path computation clients request to establish a path; sending the path computation requests from the path computation clients to all of the path computation elements of an autonomous system, each of the path computation requests carrying an identifier of the determined path computation element; upon receiving the path computation requests, recording the path computation requests by each of the path computation elements; performing the path computation in accordance with the global path computation information by the determined path computation element;

wherein the recording the path computation requests comprises: storing, path computation requests used for path computation to be performed in said path computation element, in turn in said path computation element of the domain in accordance with priorities of the path computation requests; and respectively storing path computation requests of other path computation elements of the domain;

wherein the performing the path computation in accordance with the global path computation information comprises: obtaining the path computation requests of other path computation elements stored in said path computation element, determining whether there is a race condition between a pending path computation request and the path computation requests of other path computation elements; and if there is a race condition, performing the path computation in accordance with said path computation request after the path computation requests of other path computation elements are processed and said path computation element is synchronized based on a corresponding computed result.

10. The device according to claim 9, further comprising: a determination unit, adapted for receiving a path computation request sent from a path computation client to all path computation elements in an autonomous system, recording the path computation request, and determining whether to perform path computation in accordance with an identifier carried in the path computation request.

11. The device according to claim 10, further comprising: a race condition processing unit, adapted for, before performing path computation, obtaining path computation requests of other elements stored in the storage unit, determining whether there is a race condition between a pending path computation request and the path computation requests of other path computation elements, and instructing the computation unit to perform path computation in accordance with the path computation request in the case of avoiding a race condition.

12. The device according to claim 9, further comprising: an available element notification unit, adapted for, if the available element notification unit can not perform computation in accordance with a received path computation request, determining an available path computation element in accordance with the path computation requests of the path computation elements stored in the storage unit, and sending a computation-disabled notification along with information on the available path computation element to the path computation client.

13. The device according to claim 9, further comprising: an information update unit, adapted for, upon a successful path establishment, receiving information on the established path which is distributed from the path computation client to all of the path computation elements in the domain, and updating path information and path computation requests of the global path computation information stored therein in accordance with the information on the established path.

* * * * *